(12) United States Patent
Halladay et al.

(10) Patent No.: US 8,331,888 B2
(45) Date of Patent: Dec. 11, 2012

(54) REMOTE PROGRAMMABLE REFERENCE

(75) Inventors: Henry E. Halladay, Bellevue, WA (US);
David O. Edewaard, Oakton, VA (US);
Terry M. Swann, Kent, WA (US)

(73) Assignee: The Boeing Company, Chicago, IL (US)

( * ) Notice: Subject to any disclaimer, the term of this patent is extended or adjusted under 35 U.S.C. 154(b) by 576 days.

(21) Appl. No.: 11/421,344

(22) Filed: May 31, 2006

(65) Prior Publication Data
US 2007/0281645 A1  Dec. 6, 2007

(51) Int. Cl.
*H04B 1/18* (2006.01)
(52) U.S. Cl. ............... 455/187.1; 455/419; 455/178.1; 334/7
(58) Field of Classification Search ............... 455/187.1
See application file for complete search history.

(56) References Cited

U.S. PATENT DOCUMENTS

| | | | | |
|---|---|---|---|---|
| 3,742,502 A * | 6/1973 | Brady et al. | ............... | 342/401 |
| 3,821,751 A * | 6/1974 | Loos | ............... | 342/59 |
| 3,825,929 A * | 7/1974 | Toman | ............... | 342/33 |
| 3,999,859 A * | 12/1976 | Bezerie et al. | ........... | 356/139.06 |
| 4,283,725 A * | 8/1981 | Chisholm | ............... | 342/174 |
| 4,536,843 A * | 8/1985 | Lambregts | ............... | 701/3 |
| 4,680,587 A * | 7/1987 | Chisholm | ............... | 342/33 |
| 4,750,127 A * | 6/1988 | Leslie et al. | ............... | 701/16 |
| 5,086,396 A * | 2/1992 | Waruszewski, Jr. | ............... | 701/458 |
| 5,160,933 A * | 11/1992 | Hager | ............... | 342/174 |
| 5,311,194 A * | 5/1994 | Brown | ............... | 342/357.24 |
| 5,400,031 A * | 3/1995 | Fitts | ............... | 342/36 |
| 5,402,116 A * | 3/1995 | Ashley | ............... | 340/870.1 |
| 5,455,964 A * | 10/1995 | Roos et al. | ............... | 455/516 |
| 5,467,092 A * | 11/1995 | Roos et al. | ............... | 342/174 |
| 5,497,100 A * | 3/1996 | Reiser et al. | ............... | 324/643 |
| 5,499,025 A * | 3/1996 | Middleton et al. | ............... | 340/959 |
| 5,506,588 A * | 4/1996 | Diefes et al. | ............... | 342/357.27 |
| 5,526,001 A * | 6/1996 | Rose et al. | ............... | 342/442 |
| 5,527,003 A * | 6/1996 | Diesel et al. | ............... | 244/195 |
| 5,530,349 A * | 6/1996 | Lopez et al. | ............... | 324/254 |
| 5,541,608 A * | 7/1996 | Murphy et al. | ............... | 342/442 |
| 5,596,326 A * | 1/1997 | Fitts | ............... | 342/30 |
| 5,596,332 A * | 1/1997 | Coles et al. | ............... | 342/455 |
| 5,627,546 A * | 5/1997 | Crow | ............... | 342/352 |
| 5,659,318 A * | 8/1997 | Madsen et al. | ............... | 342/25 C |
| 5,714,948 A * | 2/1998 | Farmakis et al. | ............... | 340/961 |
| 5,722,620 A * | 3/1998 | Najmabadi et al. | ............... | 244/181 |
| 5,792,427 A * | 8/1998 | Hugh et al. | ............... | 422/109 |
| 5,929,810 A * | 7/1999 | Koutsoudis et al. | ............... | 342/373 |
| 5,940,035 A * | 8/1999 | Hedrick | ............... | 342/462 |
| 5,979,835 A * | 11/1999 | Najmabadi et al. | ............... | 244/182 |
| 5,990,928 A * | 11/1999 | Sklar et al. | ............... | 725/72 |
| 5,999,108 A * | 12/1999 | Hanneman | ............... | 340/945 |
| 6,005,230 A * | 12/1999 | White et al. | ............... | 219/492 |
| 6,018,659 A * | 1/2000 | Ayyagari et al. | ............... | 455/431 |
| 6,094,169 A * | 7/2000 | Smith et al. | ............... | 342/465 |

(Continued)

*Primary Examiner* — Hai Nguyen
(74) *Attorney, Agent, or Firm* — Caven & Aghevli LLC

(57) ABSTRACT

Remote programmable reference systems and methods are described. A remote programmable reference system maintains a set of parameters from which a reference signal can be generated to transmit the reference signal to a system platform. In an embodiment, a parameters update can be received from which a modified reference signal can be generated to transmit the modified reference signal. In another embodiment, the remote programmable reference system maintains multiple sets of parameters from which respective reference signals can be generated for any one or more system platforms having different system configurations. The system platforms can interface with the remote programmable reference system through a system interface via a communication network.

20 Claims, 5 Drawing Sheets

U.S. PATENT DOCUMENTS

| | | | | |
|---|---|---|---|---|
| 6,108,539 A * | 8/2000 | Ray et al. | | 455/430 |
| 6,117,687 A * | 9/2000 | Hugh | | 436/183 |
| 6,240,294 B1 * | 5/2001 | Hamilton et al. | | 455/456.3 |
| 6,246,363 B1 * | 6/2001 | Yung et al. | | 342/357.29 |
| 6,255,982 B1 * | 7/2001 | Hethuin | | 342/122 |
| 6,259,404 B1 * | 7/2001 | Parl et al. | | 342/457 |
| 6,344,820 B1 * | 2/2002 | Shiomi et al. | | 342/174 |
| 6,356,228 B1 * | 3/2002 | Tomita | | 342/33 |
| 6,430,480 B1 * | 8/2002 | Ammar et al. | | 701/16 |
| 6,463,366 B2 * | 10/2002 | Kinashi et al. | | 701/13 |
| 6,503,751 B2 * | 1/2003 | Hugh | | 435/303.1 |
| 6,519,466 B2 * | 2/2003 | Pande et al. | | 455/456.1 |
| 6,522,296 B2 * | 2/2003 | Holt | | 342/453 |
| 6,535,666 B1 * | 3/2003 | Dogan et al. | | 385/31 |
| 6,577,266 B1 * | 6/2003 | Axline | | 342/42 |
| 6,591,171 B1 * | 7/2003 | Ammar et al. | | 701/16 |
| 6,600,927 B2 * | 7/2003 | Hamilton et al. | | 455/456.6 |
| 6,608,593 B2 * | 8/2003 | Holt | | 342/453 |
| 6,633,259 B1 * | 10/2003 | Smith et al. | | 342/456 |
| 6,646,598 B1 * | 11/2003 | Timothy et al. | | 342/359 |
| 6,675,095 B1 * | 1/2004 | Bird et al. | | 701/301 |
| 6,684,349 B2 * | 1/2004 | Gullo et al. | | 714/47 |
| 6,690,295 B1 * | 2/2004 | De Boer | | 340/951 |
| 6,735,542 B1 * | 5/2004 | Burgett et al. | | 702/85 |
| 6,738,012 B1 * | 5/2004 | Kirkpatrick | | 342/67 |
| 6,785,553 B2 * | 8/2004 | Chang et al. | | 455/456.5 |
| 6,795,019 B2 * | 9/2004 | Holt | | 342/453 |
| 6,871,077 B2 * | 3/2005 | Kennedy, Jr. | | 455/456.5 |
| 6,882,315 B2 * | 4/2005 | Richley et al. | | 342/465 |
| 6,909,381 B2 * | 6/2005 | Kahn | | 340/945 |
| 6,963,548 B1 * | 11/2005 | Chang et al. | | 370/320 |
| 6,965,816 B2 * | 11/2005 | Walker | | 701/16 |
| 6,980,151 B1 * | 12/2005 | Mohan | | 342/13 |
| 6,992,626 B2 * | 1/2006 | Smith | | 342/454 |
| 6,995,689 B2 * | 2/2006 | Crank | | 340/970 |
| 7,027,773 B1 * | 4/2006 | McMillin | | 455/41.2 |
| 7,050,786 B2 * | 5/2006 | Caci | | 455/404.2 |
| 7,050,787 B2 * | 5/2006 | Caci | | 455/404.2 |
| 7,057,556 B2 * | 6/2006 | Hall et al. | | 342/387 |
| 7,089,000 B1 * | 8/2006 | Chang et al. | | 455/430 |
| 7,123,192 B2 * | 10/2006 | Smith et al. | | 342/455 |
| 7,126,534 B2 * | 10/2006 | Smith et al. | | 342/456 |
| 7,132,982 B2 * | 11/2006 | Smith et al. | | 342/456 |
| 7,149,627 B2 * | 12/2006 | Ockerse et al. | | 701/224 |
| 7,201,347 B2 * | 4/2007 | Boe et al. | | 244/87 |
| 7,218,268 B2 * | 5/2007 | VandenBerg | | 342/25 R |
| 7,218,273 B1 * | 5/2007 | Webster et al. | | 342/174 |
| 7,221,308 B2 * | 5/2007 | Burton et al. | | 342/42 |
| RE39,829 E * | 9/2007 | Smith et al. | | 342/387 |
| 7,266,452 B2 * | 9/2007 | Ockerse et al. | | 701/224 |
| 7,272,495 B2 * | 9/2007 | Coluzzi et al. | | 701/207 |
| 7,274,326 B2 * | 9/2007 | Gibson et al. | | 342/195 |
| 7,286,085 B2 * | 10/2007 | Kolanek et al. | | 342/424 |
| 7,356,336 B2 * | 4/2008 | Perez et al. | | 455/431 |
| 7,369,229 B2 * | 5/2008 | Bissett et al. | | 356/328 |
| 7,379,814 B2 * | 5/2008 | Ockerse et al. | | 701/224 |
| 7,388,658 B2 * | 6/2008 | Glimm | | 356/139.1 |
| 7,394,723 B2 * | 7/2008 | Rubin | | 367/13 |
| 7,411,548 B2 * | 8/2008 | Lommen | | 342/386 |
| 7,423,590 B2 * | 9/2008 | Smith | | 342/450 |
| 7,424,069 B1 * | 9/2008 | Nicholls et al. | | 375/339 |
| 7,437,250 B2 * | 10/2008 | Breen et al. | | 702/34 |
| 7,453,400 B2 * | 11/2008 | Struckman et al. | | 342/465 |
| 7,453,923 B2 * | 11/2008 | Leblond et al. | | 375/148 |
| 7,477,193 B2 * | 1/2009 | Evers et al. | | 342/463 |
| 7,492,316 B1 * | 2/2009 | Ameti et al. | | 342/465 |
| 7,493,086 B2 * | 2/2009 | Landry et al. | | 455/41.3 |
| 7,495,600 B2 * | 2/2009 | Rees et al. | | 342/29 |
| 7,495,612 B2 * | 2/2009 | Smith | | 342/450 |
| 7,498,976 B2 * | 3/2009 | Schober | | 342/146 |
| 7,499,803 B2 * | 3/2009 | Hunter et al. | | 701/412 |
| 7,511,662 B2 * | 3/2009 | Mathews et al. | | 342/357.14 |
| 7,515,104 B2 * | 4/2009 | Ray et al. | | 342/464 |
| 7,536,447 B1 * | 5/2009 | O'Neil | | 709/217 |
| RE40,800 E * | 6/2009 | Smith | | 701/470 |
| 7,576,695 B2 * | 8/2009 | Smith et al. | | 342/465 |
| 7,592,943 B2 * | 9/2009 | Beasley | | 342/27 |
| 7,592,956 B2 * | 9/2009 | McPherson et al. | | 342/458 |
| 7,599,678 B2 * | 10/2009 | Fisher | | 455/323 |
| 7,612,716 B2 * | 11/2009 | Smith et al. | | 342/454 |
| 7,616,155 B2 * | 11/2009 | Bull et al. | | 342/387 |
| 7,653,394 B2 * | 1/2010 | McMillin | | 455/444 |
| 7,667,647 B2 * | 2/2010 | Breen et al. | | 342/450 |
| 7,668,632 B2 * | 2/2010 | Vian et al. | | 701/29.3 |
| 7,864,938 B2 * | 1/2011 | Rodman et al. | | 379/202.01 |
| 7,889,133 B2 * | 2/2011 | Smith et al. | | 342/450 |
| 7,893,875 B1 * | 2/2011 | Smith | | 342/464 |
| 7,907,089 B2 * | 3/2011 | Heurguier et al. | | 342/465 |
| 7,936,762 B2 * | 5/2011 | Meier et al. | | 370/395.21 |
| 7,978,838 B2 * | 7/2011 | Rodman et al. | | 379/202.01 |
| 7,986,271 B2 * | 7/2011 | Kelly | | 342/451 |
| 8,036,789 B2 * | 10/2011 | Vian et al. | | 701/31.6 |
| 8,063,826 B2 * | 11/2011 | Ameti et al. | | 342/463 |
| 8,112,113 B2 * | 2/2012 | Shinada et al. | | 455/552.1 |
| 8,150,815 B2 * | 4/2012 | Vian et al. | | 707/693 |
| 2002/0010390 A1 * | 1/2002 | Guice et al. | | 600/300 |
| 2002/0047311 A1 * | 4/2002 | Hugh | | 307/116 |
| 2002/0086684 A1 * | 7/2002 | Pande et al. | | 455/456 |
| 2002/0116127 A1 * | 8/2002 | Sadler | | 701/301 |
| 2002/0130814 A1 * | 9/2002 | Smith et al. | | 342/465 |
| 2002/0156556 A1 * | 10/2002 | Ruffner | | 701/23 |
| 2002/0183076 A1 * | 12/2002 | Pande et al. | | 455/456 |
| 2003/0007473 A1 * | 1/2003 | Strong et al. | | 370/338 |
| 2003/0033084 A1 * | 2/2003 | Corcoran, III | | 701/301 |
| 2003/0052821 A1 * | 3/2003 | Holt | | 342/453 |
| 2003/0093187 A1 * | 5/2003 | Walker | | 701/1 |
| 2003/0193408 A1 * | 10/2003 | Brown et al. | | 340/945 |
| 2003/0213868 A1 * | 11/2003 | Brunner et al. | | 244/3.16 |
| 2004/0130442 A1 * | 7/2004 | Breed et al. | | 340/443 |
| 2004/0254727 A1 * | 12/2004 | Ockerse et al. | | 701/224 |
| 2005/0053008 A1 * | 3/2005 | Griesing et al. | | 370/241 |
| 2005/0060089 A1 * | 3/2005 | Garin et al. | | 701/213 |
| 2005/0090724 A1 * | 4/2005 | Al-Ali et al. | | 600/323 |
| 2005/0143949 A1 * | 6/2005 | Hagstedt | | 702/145 |
| 2005/0159857 A1 * | 7/2005 | Parlini | | 701/4 |
| 2005/0184907 A1 * | 8/2005 | Hall et al. | | 342/387 |
| 2005/0200501 A1 * | 9/2005 | Smith | | 340/963 |
| 2005/0216139 A1 * | 9/2005 | Laughlin et al. | | 701/3 |
| 2005/0226201 A1 * | 10/2005 | McMillin | | 370/348 |
| 2005/0253928 A1 * | 11/2005 | McKeown et al. | | 348/164 |
| 2006/0036365 A1 * | 2/2006 | Chiayee et al. | | 701/213 |
| 2006/0038719 A1 * | 2/2006 | Pande et al. | | 342/357.12 |
| 2006/0071929 A1 * | 4/2006 | Stinis et al. | | 345/213 |
| 2006/0170908 A1 * | 8/2006 | Glimm | | 356/148 |
| 2006/0187114 A1 * | 8/2006 | Gibson et al. | | 342/195 |
| 2006/0244824 A1 * | 11/2006 | Debey | | 348/100 |
| 2006/0270421 A1 * | 11/2006 | Phillips et al. | | 455/457 |
| 2006/0293855 A1 * | 12/2006 | Hammarlund et al. | | 701/301 |
| 2007/0021121 A1 * | 1/2007 | Lane et al. | | 455/441 |
| 2007/0021122 A1 * | 1/2007 | Lane et al. | | 455/441 |
| 2007/0040734 A1 * | 2/2007 | Evers et al. | | 342/126 |
| 2007/0124076 A1 * | 5/2007 | Ockerse et al. | | 701/224 |
| 2007/0124796 A1 * | 5/2007 | Wittkotter | | 725/136 |
| 2007/0161383 A1 * | 7/2007 | Caci | | 455/457 |
| 2007/0173263 A1 * | 7/2007 | Karlsson | | 455/456.1 |
| 2007/0236366 A1 * | 10/2007 | Gur et al. | | 340/945 |
| 2007/0236389 A1 * | 10/2007 | Lommen et al. | | 342/386 |
| 2007/0257831 A1 * | 11/2007 | Mathews et al. | | 342/22 |
| 2007/0257832 A1 * | 11/2007 | Lommen | | 342/52 |
| 2007/0270164 A1 * | 11/2007 | Maier et al. | | 455/456.2 |
| 2007/0288166 A1 * | 12/2007 | Ockerse et al. | | 701/224 |
| 2007/0295712 A1 * | 12/2007 | Forman et al. | | 219/492 |
| 2009/0002690 A1 * | 1/2009 | Glimm | | 356/139.1 |
| 2009/0256750 A1 * | 10/2009 | Mathews et al. | | 342/450 |
| 2009/0274045 A1 * | 11/2009 | Meier et al. | | 370/235 |

* cited by examiner

REMOTE PROGRAMMABLE REFERENCE

STATEMENT OF GOVERNMENT INTEREST

This invention was made with government support under Navy Contract N9993-02-C-4048. The U.S. Government has certain rights in this invention.

TECHNICAL FIELD

The present disclosure relates to remote programmable reference.

BACKGROUND

Conventional calibration systems, such as a geolocation calibration system, utilize reference sources that are fixed in schedule and purpose, and which are tailored only for a particular system platform. As such, one reference source can not readily be used for more than one system platform. For each geolocation system platform for example, a unique and dedicated geolocation reference unit has to be designed for the specific hardware, configuration, and deployment differences of a particular system. These differences can result from different hardware implementations, and as a result of replaced components, cabling, and environmental effects such as temperature, altitude, and the like.

The differences in the system platforms require a different approach to each application, as well as the time and effort to create a unique solution for each application. In addition, each system platform requires personnel with particular expertise to deploy a solution for use, and sometimes to remote locations. Typically hands-on setup and manual operation is required. Current solutions for calibration systems, such as a geolocation system, are costly, require long lead times to deploy, have limited versatility, and are not reconfigurable.

SUMMARY

This summary introduces simplified features and concepts of remote programmable reference which are further described below in the Detailed Description. This summary is not intended to identify essential features of the claimed subject matter, nor is it intended for use in determining the scope of the claimed subject matter.

In an embodiment of remote programmable reference, a remote programmable reference system, such as a remote programmable geolocation reference system, can maintain a set of parameters and waveforms from which a reference signal can be generated to transmit the reference signal to a system platform, such as a geolocation platform. A parameters and/or waveforms update can be received from which a modified reference signal can be generated to transmit the modified reference signal.

In another embodiment of remote programmable reference, the remote programmable reference system can maintain multiple sets of parameters and/or waveforms from which respective reference signals can be generated for any one or more system platforms having different system configurations. The system platforms can each interface with the remote programmable reference system through a system interface via a communication network.

In another embodiment of remote programmable reference, a system platform can communicate an input for a calibration reference signal to a remote programmable reference system that generates and transmits the calibration reference signal. The system platform can then receive the calibration reference signal from the remote programmable reference system to calibrate the system platform. The input can be communicated to the remote programmable reference system as a request to initiate that the remote programmable reference system generate and transmit the calibration reference signal, or the input can be communicated as a set of programmable parameters from which the calibration reference signal can be generated.

BRIEF DESCRIPTION OF THE DRAWINGS

Embodiments of remote programmable reference are described with reference to the following drawings. The same numbers are used throughout the drawings to reference like features and components.

DETAILED DESCRIPTION

Remote programmable reference methods and systems are described in which embodiments provide a flexible, integrated solution for system calibration, such as for geolocation system calibration. A network centric, programmable system can provide for remote network operation, software programmable waveforms, integral RF power generation, environment exclusions bands, self-calibration, a flexible user interface, and modular expandability of the system. The software programmable waveforms can be configurable and adaptable for any number of different system platforms that may have different hardware configurations and/or characteristics that change based on equipment and environmental factors.

While features and concepts of the described systems and methods for remote programmable reference can be implemented in any number of different environments, systems, and/or configurations, embodiments of remote programmable reference are described in the context of the following exemplary environment and system architectures.

Figure 1:
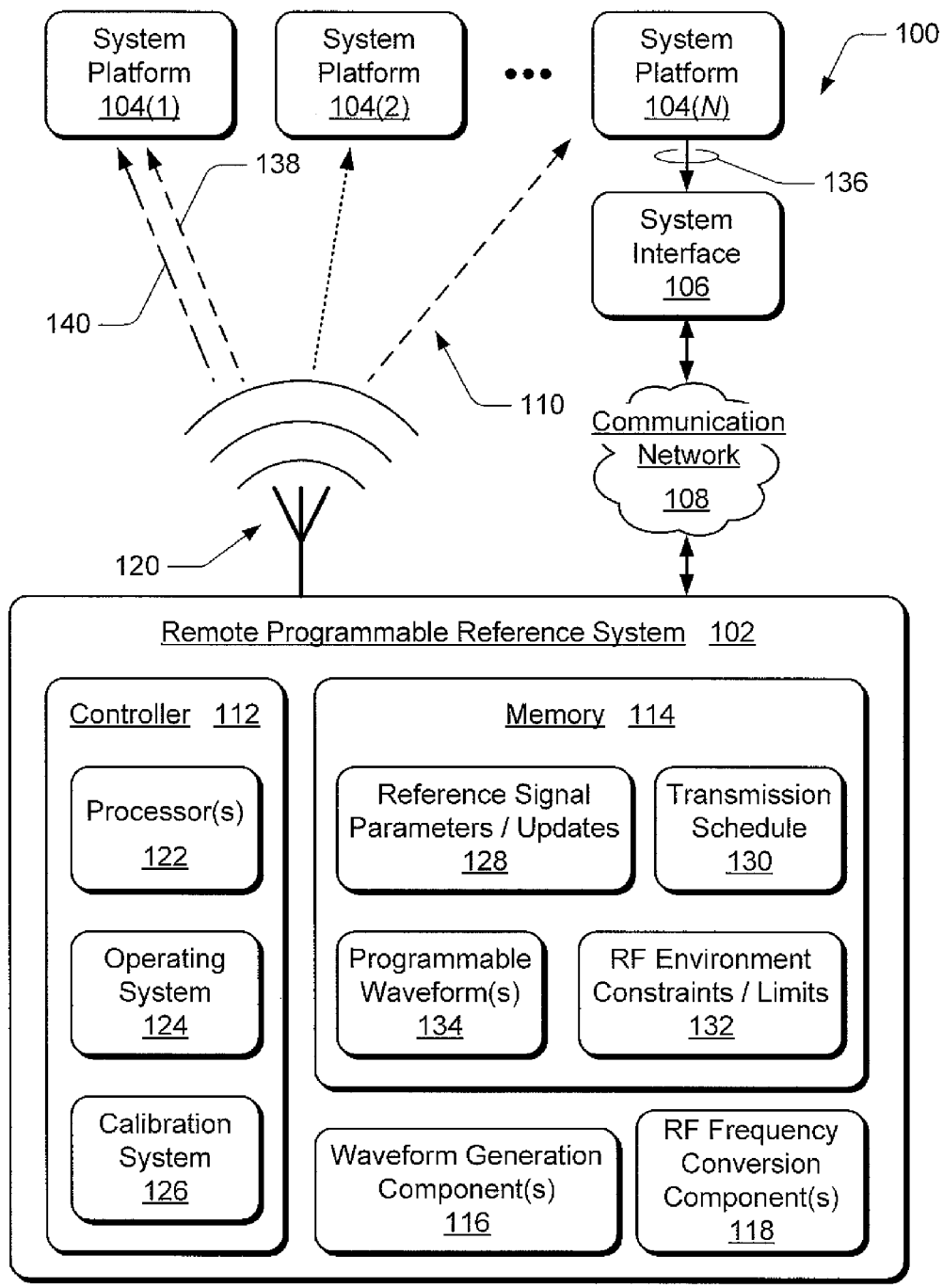
FIG. 1 illustrates an exemplary environment in which embodiments of remote programmable reference can be implemented.

FIG. 1 illustrates an exemplary system 100 in which embodiments of remote programmable reference can be implemented. The environment 100 includes a remote programmable reference system 102, system platforms 104(1-N), and a system interface 106, each of which is configured for communication via a communication network 108. Any of the systems and/or devices can be configured for network access in any number of embodiments and varieties of implementation. In an embodiment of remote programmable reference, the system 102 can be implemented as a remote programmable geolocation reference system, and the system platforms 104(1-N) can be implemented as geolocation platforms.

The remote geolocation reference system 102 functions to generate reference signals 110 (also "beacons") that are transmitted at a specific time, duration, and power level as a reference signal requested or scheduled by a user to calibrate out system delays, propagation effects, and other transmission distortions that may impact system accuracy. The specific waveform characteristics, frequencies, transmission durations, and scheduled transmission start times are downloaded over the network interface 106 to the remote programmable reference system 102 and entered into a scheduling queue.

Any regional constraints with respect to frequency band exclusions, signal levels, and/or transmission durations can also be downloaded or preprogrammed. Multiple tasks (e.g., the generation and transmission of reference signals) can be scheduled based on priority assignments and with respect to designated schedule conflict resolutions such that multiple users can access and schedule the generation and transmission of a reference signal. A security access system with various security credential requirements can also be implemented to control system access and use. Additionally, a removable memory component can be utilized to further implement security constraints.

A platform 104(1-N) can be any type of satellite or overhead system, a ground based station, an aircraft, a ship or other watercraft, or any other type of mobile or stationary platform that receives reference signal(s) 110 from the remote programmable reference system 102. Any of the various platforms 104(1-N) can utilize a reference signal 110 for target identification and tracking, coastal perimeter and mainland border security, collision detection and warning, and for other implementations. In addition, the remote programmable reference system 102 can be implemented as a stationary, mobile, and/or as a portable network centric, programmable reference system to generate the reference signal(s) 110.

The communication network 108 can be implemented as any one or combination of a wide area network (e.g., the Internet), a local area network (LAN), an intranet, an IP-based network, broadcast network, a public telephone network, a wireless network, or other type of network. Additionally, communication network 108 can be implemented using any type of network topology and any network communication protocol, and can be represented or otherwise implemented as a combination of two or more networks.

In this example, the remote programmable reference system 102 includes a controller 112, memory component(s) 114, waveform generation component(s) 116, RF frequency conversion components 118, and an antenna system 120. The controller 112 includes one or more processor(s) 122 as well as an operating system 124 and a calibration system 126 which can each be implemented as computer executable instructions and executed by the processor(s) 122 to implement embodiments of remote programmable reference. The calibration system 126 can be implemented to measure the internal characteristics of the remote programmable reference system 102 to evaluate system performance. The main memory component(s) 114 maintain sets of reference signal parameters and/or parameter updates 128, a reference signal transmission schedule 130, local RF environment constraints and limits 132, and programmable waveforms 134.

The waveform generation components 116 can include the memory 114 (or a portion thereof) as high speed memory that maintains the programmable waveforms 134 to be transmitted, and can include a digital-to-analog converter that interfaces with the RF frequency conversion components 118 to provide a modulated signal output to the antenna components 120. In an embodiment, the remote programmable reference system 102 may be implemented with any number and combination of differing components as further described below with reference to the exemplary remote programmable geolocation reference system 500 shown in FIG. 5.

The controller 112 of the remote programmable reference system 102 can process multiple sets of reference signal parameters 128 (also, "programmable parameters" to generate respective reference signals 110 at scheduled transmission start times according to the transmission schedule 130. The reference signal parameters 114 can include any one or combination of software programmable waveforms 134, a transmission start time for a reference signal, a transmission duration of a reference signal, a reference signal power level, a reference signal frequency, an antenna band designation, an exclusion band designation (such as radio, television, and/or cell phone bands), and/or geographic location information (such as GPS information). A reference signal 110 can also include position, velocity, and acceleration information pertaining to a mobile or portable remote programmable reference system 102 that, for example, is implemented in an aircraft.

Any of the system platforms 104(1-N) can communicate system inputs 136 through the system interface 106 and via the communication network 108 to the remote programmable reference system 102 (although only system platform 104(N) is illustrated as such). Although the system interface 106 is shown as an independent component, each of the system platforms 104(1-N) can implement a system interface to the remote programmable reference system 102 via communication network 108. A system platform 104 can communicate a set of reference signal parameters and/or a parameter update 128 to the remote programmable reference system 102, or can communicate an input 136 to the controller 112 to initiate processing a set of the reference signal parameters 128 to generate a reference signal that is transmitted to a system platform 104 via the antenna system 120.

For example, the controller 112 can process a set of the reference signal parameters 128 to generate a reference signal 138 for transmission to the system platform 104(1) at a designated time according to the transmission schedule 130. The remote programmable reference system 102 can then receive a parameters update from the system platform 104(1) via the system interface 106 to modify the reference signal. Additionally, the remote programmable reference system 102 can receive another input from the system platform 104(1) to initiate that the controller 112 process the parameters update 128 to generate a modified reference signal 140 that is also transmitted to the system platform 104(1).

The remote programmable reference system 102 can be implemented as a software, firmware, and/or hardware system that is a flexible, integrated solution for system calibration, such as for geolocation system calibration. The system 102 can provide for remote network operation, software programmable waveforms, integral RF power generation, environment exclusions bands, self-calibration, a flexible user interface, and modular expandability of the system. The software programmable waveforms, such as may be defined by the sets of reference signal parameters 128, can provide that the remote programmable reference system 102 is configurable and adaptable for any number of different system platforms 104(1-N) that may have different hardware configurations and/or characteristics that change based on equipment and environmental factors. A reference signal 110 generated by the remote programmable reference system 102 may take into account the errors and/or deviations that the effects of the many temperature, climate, and operational factors may have on the precise time and geographic location information derived from a reference signal.

The remote programmable reference system 102 in environment 100 may provide several advantages for a calibration system, such as: programmable waveform generation, local storage of the programmable waveforms (e.g., the reference signal parameters 128), and time scheduled transmissions of the reference signals 110; a network interface 106 for scheduling, system status monitoring, and waveform loading; network centric activity report messages, scheduling messages, and status capability reporting; arbitrary waveform signaling from the stored programmable waveforms or via downloaded files and instructions; timing based on local GPS (Global Positioning System) components including precision frequency reference and coordinates; high and low band antenna provisions to select antennas based on frequency ranges; programmable frequency constraints to exclude frequencies based on location, such as around airports or other frequency-sensitive locations; programmable reference signal transmission power; integral system monitoring of transmitter temperature, antenna VSWR (voltage standing wave ratio), and transmit power levels; broadband power level compensation to compensate for power level gain and propagation losses over wide band frequency emissions; pre-scheduled transmission capability with a "transmit now" provision when receiving an input from a system platform 104(1-N); and modularity to implement an expansion of frequency coverage as needed.

The controller 112 of the remote programmable reference system 102 can process multiple sets of reference signal parameters 128 (also, "programmable parameters") to generate respective reference signals 110 at scheduled transmission start times according to the transmission schedule 130. The reference signal parameters 128 can include any one or combination of software programmable waveforms 134, a transmission start time for a reference signal, a transmission duration of a reference signal, a reference signal power level, a reference signal frequency, an antenna band designation, an exclusion band designation (such as radio, television, and/or cell phone bands), and/or geographic location information (such as GPS information). A reference signal 110 can also include position, velocity, and acceleration information pertaining to a mobile or portable remote programmable reference system 102 that, for example, is implemented in an aircraft.

Methods for remote programmable reference, such as exemplary methods 200, 300, and 400 described with reference to respective FIGS. 2, 3, and 4 may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 2:
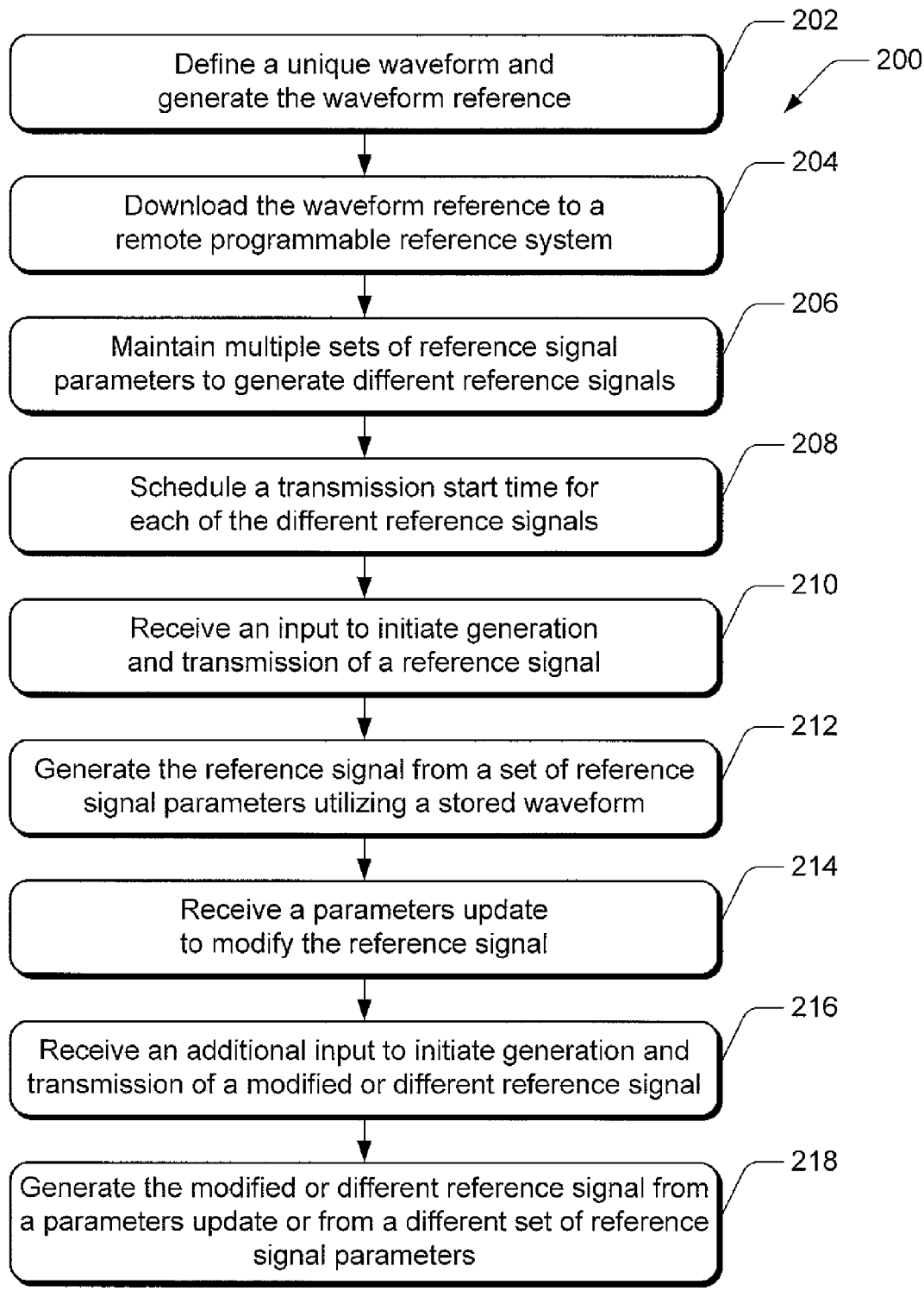
FIG. 2 illustrates exemplary method(s) for remote programmable reference.

FIG. 2 illustrates an exemplary method 200 for remote programmable reference and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 202, a unique waveform is defined according to requirements of a system application, and a reference of the waveform is generated. For example, the unique waveform can be developed as a simple unmodulated carrier waveform, as a pseudo-random sequence encoded waveform, and the like. At block 204, the waveform reference is communicated or downloaded to the remote programmable reference system.

At block 206, multiple sets of reference signal parameters are maintained to generate different reference signals, where each set of parameters corresponds to a different programmable reference signal. For example, memory 114 of the remote programmable reference system 102 (FIG. 1) maintains a set of reference signal parameters 128 from which a reference signal 110 can be generated. In an embodiment, the set of parameters are programmable and include any one or combination of a programmable waveform, a reference signal transmission start time, a reference signal transmission duration, a reference signal power Level, a reference signal frequency, an antenna band designation, an exclusion band designation, and/or geographic location information, such as from GPS.

At block 208, a transmission start time is scheduled for each of the different reference signals. For example, the transmission schedule 130 in the remote programmable reference system 102 includes scheduled times for the controller 112 to initiate generating each of the reference signals from the respective sets of reference signal parameters 128.

At block 210, an input is received to initiate generation and transmission of a reference signal. For example, controller 112 of the remote programmable reference system 102 receives an input such that the controller 112 initiates generating a reference signal for transmission. In an embodiment, the input to initiate the reference signal is a scheduled transmission start time, such as maintained in transmission schedule 130 at the remote programmable reference system 102. In another embodiment, a system platform 104 communicates an input 136 through the system interface 106 via the communication network 108 to the remote programmable reference system 102 to initiate the controller 112 generating a reference signal for transmission back to the requesting system platform 104.

In yet another embodiment, a system platform 104 can communicate a reference signal request directly to the remote programmable reference system 102 to request transmission of a reference signal. In an implementation of remote programmable reference, an airport may implement the remote programmable reference system 102 that can transmit, upon request or as scheduled, a custom calibration reference signal 110 to each requesting aircraft (e.g., system platform 104) to calibrate the voice, video, radar, and data receivers of an aircraft.

At block 212, the reference signal is generated from a set of parameters to transmit the reference signal and an associated waveform. For example, the controller 112 of the remote programmable reference system 102 initiates generating the reference signal 138 from a stored waveform 134 for transmission via the antenna assembly 120 to the system platform 104(1). The reference signal 138 can be generated according to the transmission schedule 130 in an event that the input to initiate generating the reference signal 138 is a schedule transmission start time input.

At block 214, a parameters update is received to modify the reference signal. For example, the controller 112 of the remote programmable reference system 102 receives a parameters update 128 which is maintained by memory 114 at the remote programmable reference system 102. In an embodiment, the parameters update is received from system platform 104(1) to modify the reference signal 138. In another embodiment, the parameters update is received from system platform 104(N) that has a different system configuration than system platform 104(1). A system platform 104 communicates the parameters update through the system interface 106 via the communication network 108 to the remote programmable reference system 102 to be stored in memory 114.

At block 216, an additional input is received to initiate generation and transmission of a modified or different reference signal. For example, controller 112 of the remote programmable reference system 102 receives an input such that the controller 112 initiates generating the modified or different reference signal for transmission. In an embodiment, system platform 104(1) communicates an additional input 136 through the system interface 106 via the communication network 108 to initiate the controller 112 generating the modified reference signal 140 for transmission such that the system platform 104(1) receives both the reference signal 138 and the modified reference signal 140. In another embodiment, system platform 104(N) communicates an input 136 through the system interface 106 via the communication network 108 to initiate the controller 112 generating the different reference signal 110 for transmission where the system platform 104(N) has a different system configuration than system platform 104(1).

At block 218, the modified or different reference signal is generated from the parameters update or from a different set of parameters to transmit the modified or different reference signal. For example, the controller 112 of the remote programmable reference system 102 initiates generating the reference signal 140 for transmission via the antenna assembly 120 to the system platform 104(1), or alternatively, initiates generating the different reference signal 110 for transmission via the antenna assembly 120 to the system platform 104(N).

Figure 3:
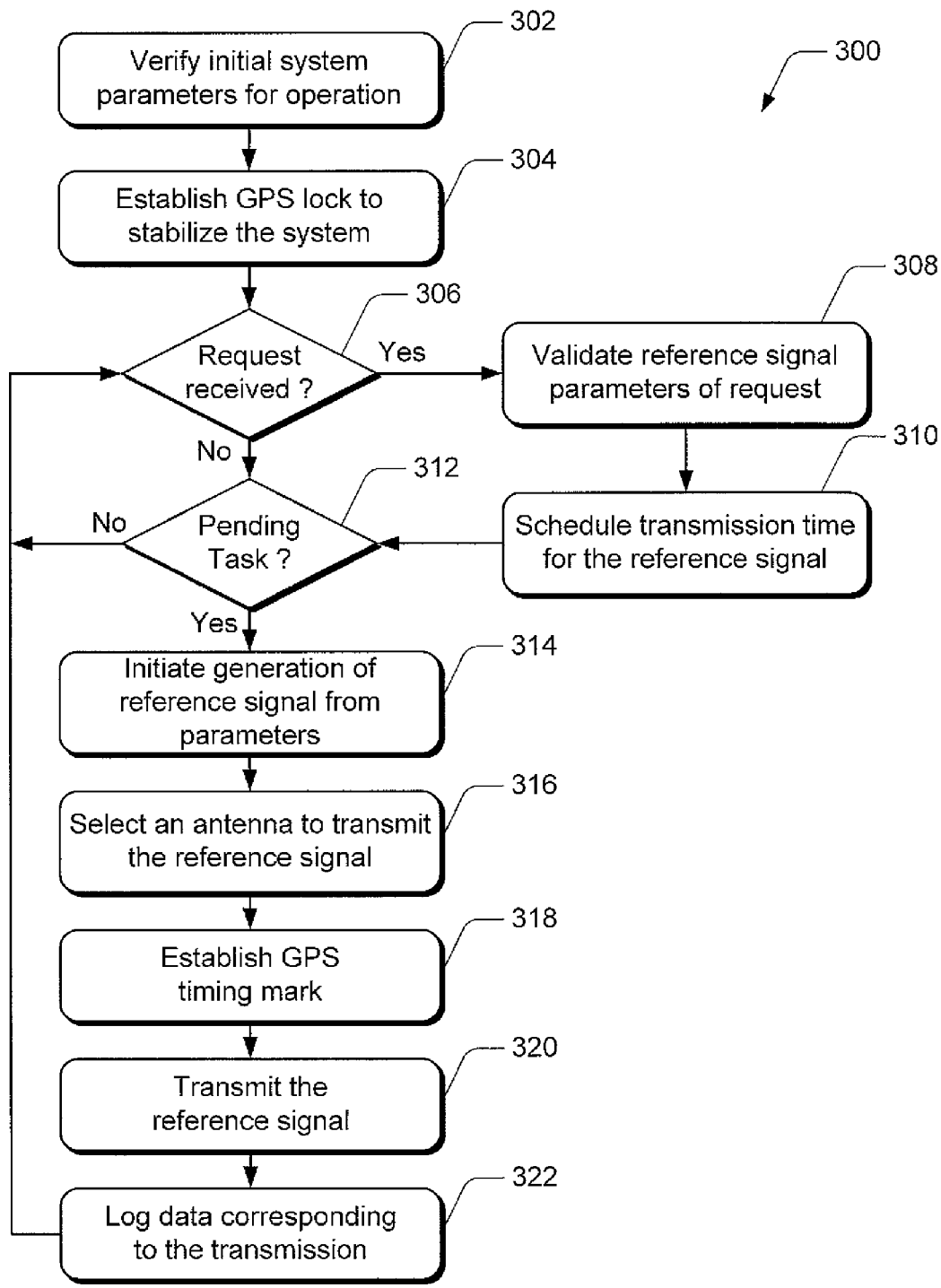
FIG. 3 illustrates exemplary method(s) for remote programmable reference.

FIG. 3 illustrates an exemplary method 300 for remote programmable reference and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, initial system parameters are verified for operation and, at block 304, a GPS lock is established to stabilize the system. For example, parameters of the remote programmable reference system 102 (FIG. 1) are verified for operation and the system is stabilized and/or coordinated with a GPS signal. Alternatively, the remote programmable reference system 102 can include a locked time reference for use in an event that the GPS signal is lost or cannot be acquired.

At block 306, a determination is made as to whether a request to transmit or schedule a reference signal is received. For example, a system platform 104 can communicate a request or input 136 through the system interface 106 via the communication network 108 to the remote programmable reference system 102 to schedule a reference signal, or to initiate the controller 112 generating a reference signal for transmission.

If a request is received (i.e., "yes" from block 306), then the reference signal parameters of the request are validated at block 308. At block 310, a transmission time is scheduled for the reference signal. For example, the remote programmable reference system 102 maintains a transmission schedule 130 to generate and transmit the reference signals 110.

If a request is not received (i.e., "no" from block 306), or continuing from block 310, then a determination is made as to whether there are pending tasks at block 312. If there are no pending or scheduled tasks (i.e., "no" from block 312), then the method continues at block 306 waiting to receive a request. If there is a pending or scheduled task (i.e., "yes" from block 312), then generation of a reference signal from a set of parameters is initiated at block 314. For example, the controller 112 initiates generation of a reference signal 110 from a set of reference signal parameters 128.

At block 316, an antenna is selected to transmit the reference signal and, at block 318, a GPS timing mark is established. At block 320, the reference signal is transmitted. For example, the remote programmable reference system 102 transmits the reference signal 110 to a system platform 104 via an antenna of the antenna system 120. At block 322, data corresponding to the transmission is logged to maintain a record of the transmission.

Figure 4:
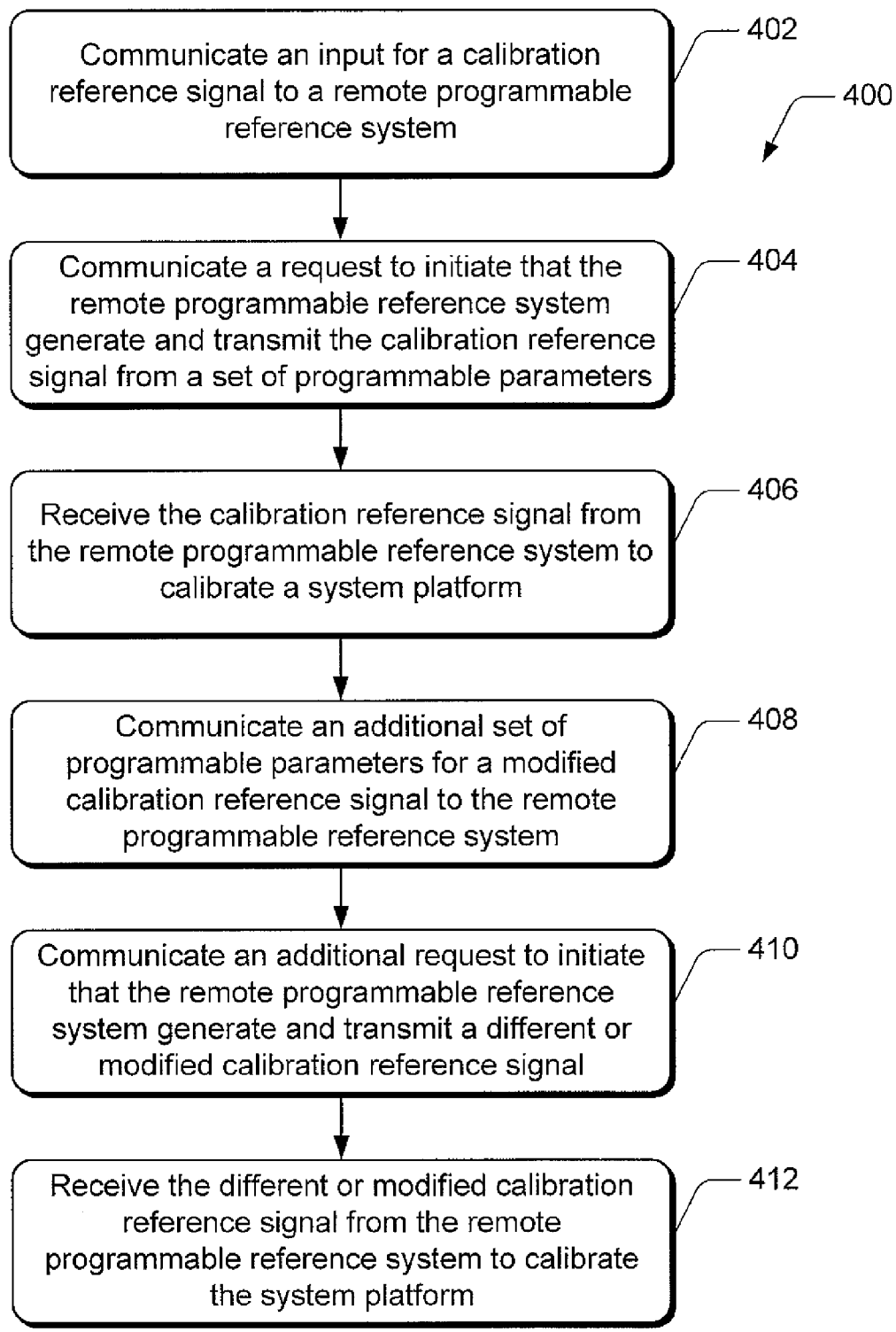
FIG. 4 illustrates exemplary method(s) for remote programmable reference.

FIG. 4 illustrates an exemplary method 400 for remote programmable reference and is described with reference to the exemplary environment 100 shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, an input for a calibration reference signal is communicated to a remote programmable reference system that generates and transmits the calibration reference signal. For example, a system platform 104(1) (FIG. 1) communicates an input to the remote programmable reference system 102. The system platform 104(1) can communicate an input 136 to the remote programmable reference system 102 via the communication network 108 through the system interface 106. The input can be communicated to the remote programmable reference system 102 to initiate that the remote programmable reference system 102 generate and transmit the calibration reference signal, and/or the input can be communicated as a set of programmable parameters from which the calibration reference signal is generated. The calibration reference signal can also be generated at a scheduled time for transmission of the calibration reference signal as an alternative to generating the calibration reference signal in response to receiving a request from a system platform.

At block 404, a request is communicated to initiate that the remote programmable reference system generate and transmit the calibration reference signal from the set of programmable parameters. At block 406, the calibration reference signal is received from the remote programmable reference system to calibrate the system platform. For example, the system platform 104(1) receives a calibration reference signal 138 from the remote programmable reference system 102 to calibrate the system platform 104(1).

At block 408, an additional set of programmable parameters for a modified calibration reference signal is communicated to the remote programmable reference system. For example, the system platform 104(1) can communicate an additional set of programmable parameters to the remote programmable reference system 102 from which a different or modified calibration reference signal is generated.

At block 410, an additional request is communicated to initiate that the remote programmable reference system generate and transmit the different or modified calibration reference signal from the additional set of programmable parameters. At block 412, the different or modified calibration reference signal is received from the remote programmable reference system to calibrate the system platform. For example, the system platform 104(1) receives a different or modified calibration reference signal 140 from the remote programmable reference system 102 to calibrate the system platform 104(1).

Figure 5:
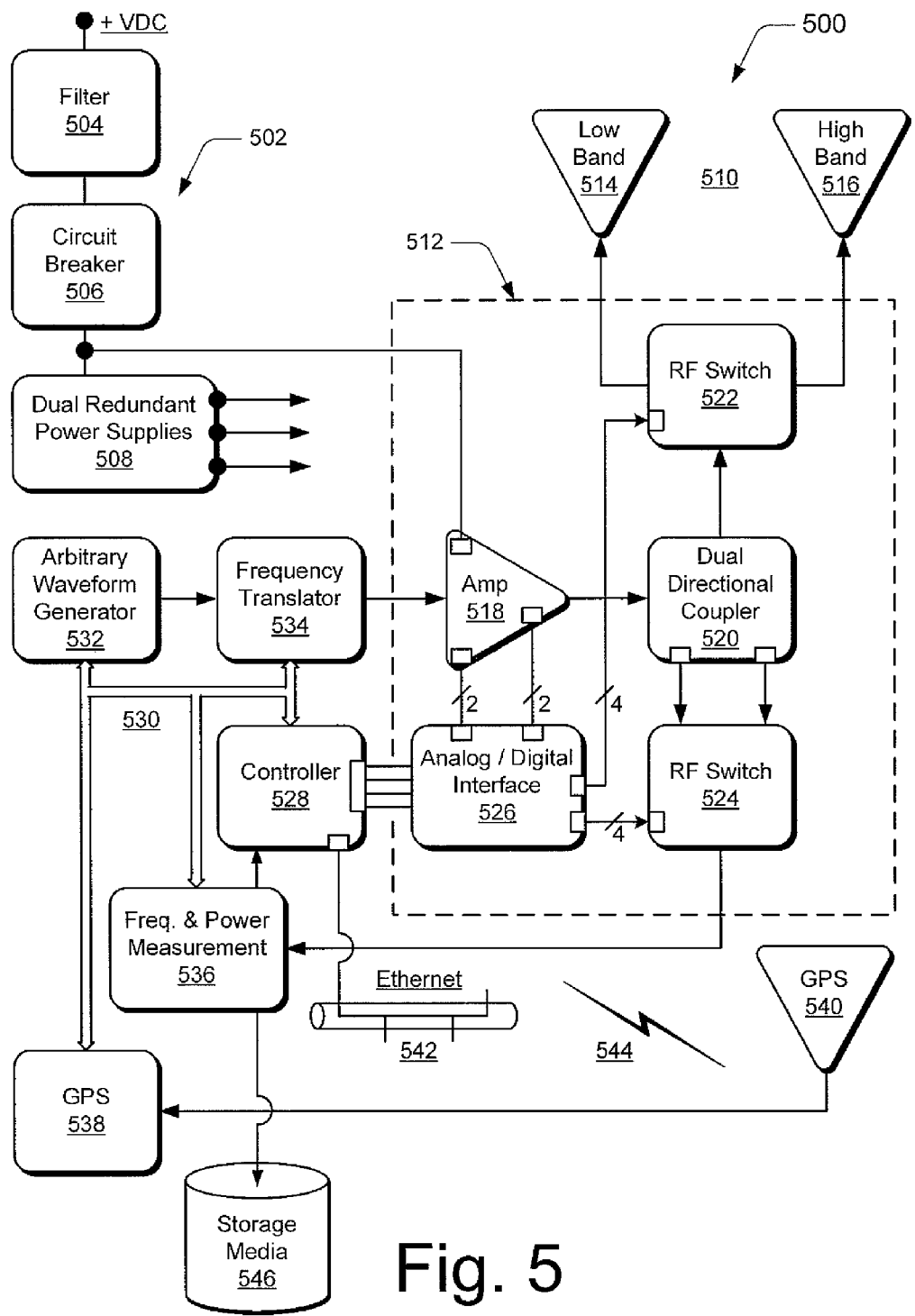
FIG. 5 illustrates various components of an exemplary programmable geolocation system in which embodiments of remote programmable reference can be implemented.

FIG. 5 illustrates an exemplary remote programmable geolocation reference system 500 in which embodiments of remote programmable reference can be implemented. In one embodiment, the exemplary system 500 can be implemented as the remote programmable reference system 102 shown in FIG. 1 and/or can include any of the components described with reference to the remote programmable reference system 102.

The remote programmable geolocation reference system 500 includes power components 502, such as a filter 504 to which power is input, a circuit breaker 506, and dual redundant power supplies 508. In an embodiment, the system 500 is implemented with commercially available components and operates on a +24 VDC power input to a military standard 461E filter 504 and a twenty (20) amp circuit breaker 506. The dual redundant power supplies 508 can be implemented for twenty-four (24) volt power.

The remote programmable geolocation reference system 500 also includes an antenna system 510 and an antenna interface module 512. In this example, the antenna system 510 includes a low band antenna 514 and a high band antenna 516. The antenna interface module 512 includes a power amplifier 518, a dual directional coupler 520 to measure antenna power, RF switches 522 and 524, and an analog-to-digital interface 526. The RF switch 522 couples the low band antenna 514 and the high band antenna 516 to transmit geolocation reference signals from the remote programmable geolocation reference system 500.

The exemplary system 500 also includes a controller 528 that controls the remote programmable geolocation reference system 500 to implement embodiments of remote programmable reference as described herein. The controller 528 communicates with various components of the exemplary system 500 via a communications bus 530 that communicatively couples an arbitrary waveform generator 532, a frequency translator 534, a frequency and power measurement component 536, and a GPS component receiver 538. The exemplary system 500 includes a GPS antenna 540 via which the GPS component receiver 538 receives GPS location and timing information.

The controller 528 can be implemented as any form of computing-based device which serves as a network interface, software integration component, and activity coordinator and monitor of system 500. The various hardware and/or software modules and components of system 500 provide the time and position information, waveform generation, frequency conversion, power amplification, and RF interface for programmable geolocation reference signals.

The controller 528 can include communication interfaces (not shown) which can be implemented as any one or more of a serial and/or parallel interface, a wireless interface, any type of network interface, a modem, and as any other type of communication interface. In this example, the controller 528 interfaces with a geolocation platform interface via a wired connection, such as Ethernet 542 and/or via a wireless connection 544 which enables controller 528 to receive control input commands from geolocation platforms and other input sources.

The exemplary system 500 also includes a storage media 546 which can be implemented as any type of magnetic or optical storage device, such as a hard disk drive, a recordable and/or rewriteable compact disc (CD), a DVD, a DVD+RW, and the like. The controller 528 can access the storage media 546 and/or the controller 528 can be implemented with computer readable media, such as one or more memory components, examples of which include random access memory (RAM) and non-volatile memory (e.g., any one or more of a read-only memory (ROM), flash memory, EPROM, EEPROM, etc.).

The storage media 546 and computer readable media integrated with the controller 528 provides data storage mechanisms to store various information and/or data such as software applications and any other types of information and data related to operational aspects of the remote programmable geolocation reference system 500. For example, the operating system 124 (FIG. 1), calibration system 126, and/or other application programs can be maintained as software applications with the storage media 546 (and other computer readable media) and executed on processor(s) of the controller 528 to implement embodiments of remote programmable reference.

Although embodiments of remote programmable reference have been described in language specific to structural features and/or methods, it is to be understood that the subject of the appended claims is not necessarily limited to the specific features or methods described. Rather, the specific features and methods are disclosed as exemplary implementations of remote programmable reference.

The invention claimed is:

1. A method, comprising:
maintaining, in a memory module coupled to a reference system, a set of programmable reference signal parameters, the set of programmable reference signal parameters including a reference signal frequency and a specific antenna band designation;
generating, in the reference system, a reference signal from the set of programmable reference signal parameters;
transmitting the reference signal from the reference system to an aircraft platform according to: (1) a transmission schedule stored at the reference system and (2) the specific antenna band designation;
receiving, at the reference system, an updated set of programmable reference signal parameters from the aircraft platform;
generating, in the reference system, a modified reference signal at the reference system based on the received updated set of programmable reference signal parameters, wherein the modified reference signal describes a positioning of the aircraft platform with a greater accuracy than the reference signal; and
transmitting the modified reference signal from the reference system to the aircraft platform.

2. A method as recited in claim 1, wherein the reference system is a mobile programmable reference system, and further wherein the reference signal includes a position, velocity, and acceleration information associated with the reference system.

3. A method as recited in claim 1, further comprising receiving, at the reference system, a modification input from the aircraft platform, the modification input to initiate the generating the modified reference signal.

4. A method as recited in claim 1, wherein the transmission schedule is received from the aircraft platform via a communication network.

5. A method as recited in claim 1, wherein the set of programmable reference signal parameters further include at least one of: a transmission start time; a transmission duration; a reference signal power level; a reference signal frequency; an exclusion band designation; or geographic location information.

6. A method, comprising:
  receiving, at a reference system, a calibration input from a system platform to initiate generation of a calibration reference signal, the calibration input including a set of programmable parameters;
  generating, in the reference system, the calibration reference signal from the set of programmable parameters including a reference signal frequency and a specific antenna band designation;
  transmitting the calibration reference signal via a radio frequency (RF) switch of the reference system coupled to a low band antenna and a high band antenna of the reference system, the calibration reference signal transmitted according to a transmission schedule stored at the reference system;
  receiving, at the reference system, an additional set of programmable parameters from the system platform;
  modifying, upon request at the reference system, the calibration reference signal based on the additional set of programmable parameters;
  transmitting the modified calibration reference signal from the reference system; and
  calibrating the system platform based on the modified calibration reference signal received from the reference system.

7. A method as recited in claim 6, further comprising receiving an input from the system platform to initiate the generating the calibration reference signal, the input received via a communication network and through a network interface.

8. A method as recited in claim 6, further comprising:
  receiving an input from the system platform to initiate the generating the calibration reference signal; and
  receiving an additional input from the system platform to initiate the modifying the calibration reference signal.

9. A method as recited in claim 6, wherein the reference system is implemented in an airport and the system platform is an aircraft such that the transmitting the calibration reference signal transmits the calibration reference signal to the aircraft to calibrate at least one a voice, video, radar, and data receiver of the aircraft.

10. A method as recited in claim 6, wherein the transmission schedule includes a scheduled time for transmission of the calibration reference signal from the reference system to the system platform.

11. A method as recited in claim 6, wherein the set of programmable parameters include at least one of: a reference signal frequency; an antenna band designation; an exclusion band designation; and geographic location information.

12. A method as recited in claim 6, further comprising maintaining multiple sets of programmable parameters at the reference system, each set corresponding to a different programmable reference signal for a different system platform.

13. A method of calibrating aircraft data, comprising:
  maintaining a set of programmable reference signal parameters at an airport reference system, the set of programmable reference signal parameters including:
    a transmission duration,
    a reference signal power level,
    a reference signal frequency, and
    an antenna band designation;
  transmitting a calibration reference signal from the airport reference system to an aircraft, the calibration reference signal transmitted according to the transmission duration, the reference signal power level, the reference signal frequency, and the antenna band;
  receiving, in the airport reference system, an updated set of programmable reference signal parameters;
  modifying, in the airport reference system, the calibration reference signal to calibrate out a propagation effect of the calibration reference signal, the calibration reference signal modified based on the updated set of programmable reference signal parameters; and
  transmitting the modified calibration reference signal from the airport reference system to the aircraft.

14. A method as recited in claim 13, further comprising receiving an input from the aircraft to transmit the calibration reference signal, the input received via a communication network and through a network interface.

15. A method as recited in claim 13, wherein the modified calibration reference signal is transmitted upon request from the aircraft.

16. A method as recited in claim 13, wherein the calibration reference signal contains data to calibrate radar data of the aircraft.

17. A method as recited in claim 13, wherein the calibration reference signal contains data to calibrate voice data of the aircraft.

18. A method as recited in claim 17, wherein the set of programmable reference signal parameters further includes at least one of an exclusion band designation and geographic location information.

19. A method as recited in claim 13, wherein the calibration reference signal contains data to calibrate video data of the aircraft.

20. A method as recited in claim 13, wherein the transmitting the calibration reference signal transmits the calibration reference signal at a scheduled time.

* * * * *